United States Patent
Kokemohr

(10) Patent No.: US 10,554,857 B2
(45) Date of Patent: *Feb. 4, 2020

(54) METHOD FOR NOISE-ROBUST COLOR CHANGES IN DIGITAL IMAGES

(71) Applicant: Google LLC, Mountain View, CA (US)

(72) Inventor: Nils Kokemohr, Hamburg (DE)

(73) Assignee: Google LLC, Mountain View, CA (US)

(*) Notice: Subject to any disclaimer, the term of this patent is extended or adjusted under 35 U.S.C. 154(b) by 181 days.

This patent is subject to a terminal disclaimer.

(21) Appl. No.: 15/842,813

(22) Filed: Dec. 14, 2017

(65) Prior Publication Data

US 2018/0124283 A1 May 3, 2018

Related U.S. Application Data

(60) Division of application No. 15/214,238, filed on Jul. 19, 2016, now Pat. No. 9,883,079, which is a division
(Continued)

(51) Int. Cl.
| | |
|---|---|
| *G06K 9/00* | (2006.01) |
| *G06K 9/40* | (2006.01) |
| *H04N 1/58* | (2006.01) |
| *G06T 5/00* | (2006.01) |
| *G06T 11/00* | (2006.01) |

(Continued)

(52) U.S. Cl.
CPC ............... *H04N 1/58* (2013.01); *G06T 5/002* (2013.01); *G06T 5/20* (2013.01); *G06T 11/001* (2013.01); *H04N 1/4092* (2013.01); *H04N 1/62* (2013.01); *G06T 2207/10024* (2013.01); *G06T 2207/20004* (2013.01); *G06T 2207/20024* (2013.01); *G06T 2207/20192* (2013.01); *G06T 2207/20221* (2013.01)

(58) Field of Classification Search
None
See application file for complete search history.

(56) References Cited

U.S. PATENT DOCUMENTS

| | | |
|---|---|---|
| 5,638,496 A | 6/1997 | Sato |
| 5,764,307 A | 6/1998 | Ozcelik et al. |

(Continued)

FOREIGN PATENT DOCUMENTS

| | | |
|---|---|---|
| EP | 0886437 | 12/1998 |
| JP | 07162677 | 6/1995 |

(Continued)

OTHER PUBLICATIONS

Chiyo, et al., Sentakuhanni-hen, Mac-fan Special 14, Mainichi Communications, Japan, Feb. 2001, pp. 51-70.
(Continued)

*Primary Examiner* — Randolph I Chu
(74) *Attorney, Agent, or Firm* — IP Spring

(57) ABSTRACT

A method for applying filters to digital images with minimal amplification of image noise, comprising filtering the digital image with an EPDR edge-preserving detail-reducing filter, determining a matrix from the filtered image as a result of one or more structure adaptive functions, and modifying the digital image using the filter, adjusted by the matrix values, to produce an enhanced digital image. The order of processing may be inverted, by first determining the matrix and then filtering the matrix with the edge-preserving detail-reducing filter.

20 Claims, 8 Drawing Sheets

Related U.S. Application Data of application No. 14/485,694, filed on Sep. 13, 2014, now Pat. No. 9,407,790, which is a continuation of application No. 12/146,769, filed on Jun. 26, 2008, now Pat. No. 8,837,849.

(60) Provisional application No. 60/946,362, filed on Jun. 26, 2007.

(51) Int. Cl.
*H04N 1/409* (2006.01)
*H04N 1/62* (2006.01)
*G06T 5/20* (2006.01)

(56) References Cited

U.S. PATENT DOCUMENTS

| | | | |
|---|---|---|---|
| 5,819,035 | A | 10/1998 | Devaney et al. |
| 6,535,301 | B1 | 3/2003 | Kuwata et al. |
| 7,110,455 | B2 | 9/2006 | Wu et al. |
| 7,515,745 | B1 | 4/2009 | Skirko |
| 7,853,094 | B2 | 12/2010 | Pan et al. |
| 7,995,839 | B2 | 8/2011 | Tanaka et al. |
| 2002/0047911 | A1 | 4/2002 | Tsuchiya et al. |
| 2005/0041883 | A1 | 2/2005 | Maurer et al. |
| 2005/0089239 | A1 | 4/2005 | Brajovic |
| 2006/0008171 | A1 | 1/2006 | Petschnigg et al. |
| 2006/0104538 | A1 | 5/2006 | Izumi |
| 2006/0170978 | A1 | 8/2006 | Gao et al. |
| 2007/0009167 | A1 | 1/2007 | Dance et al. |
| 2007/0165962 | A1 | 7/2007 | Smirnov et al. |
| 2008/0226191 | A1 | 9/2008 | Ohwaki et al. |
| 2008/0240601 | A1 | 10/2008 | Adams et al. |
| 2009/0091643 | A1 | 4/2009 | Aragaki |
| 2011/0211126 | A9 | 9/2011 | Tsukioka |
| 2011/0317045 | A1 | 12/2011 | Vakrat et al. |

FOREIGN PATENT DOCUMENTS

| | | |
|---|---|---|
| JP | 10091761 | 4/1998 |
| JP | 11146219 | 5/1999 |
| JP | 2000151985 | 5/2000 |
| JP | 200167469 | 3/2001 |

OTHER PUBLICATIONS

USPTO, Notice of Allowance for U.S. Appl. No. 14/485,694, dated Apr. 11, 2016, 7 pages.
USPTO, First Action Interview, Pre-Interview Communication for U.S. Appl. No. 15/214,238, dated Jan. 11, 2017, 7 pages.
USPTO, First Action Interview, Office Action Summary for U.S. Appl. No. 15/214,238, dated May 4, 2017, 7 pages.
USPTO, Non-final Office Action for U.S. Appl. No. 14/485,694, dated Dec. 17, 2015, 8 pages.
USPTO, Final Office Action for U.S. Appl. No. 12/146,769, dated Jan. 2, 2014, 8 pages.
USPTO, Non-final Office Action for U.S. Appl. No. 12/146,769, dated Jul. 10, 2013, 8 pages.
USPTO, Non-final Office Action for U.S. Appl. No. 12/146,769, dated May 24, 2012, 8 pages.
USPTO, Notice of Allowance for U.S. Appl. No. 15/214,238, dated Oct. 13, 2017, 8 pages.
USPTO, Final Office Action for U.S. Appl. No. 12/146,769, dated Jan. 7, 2013, 9 pages.
USPTO, Notice of Allowance for U.S. Appl. No. 12/146,769, dated May 13, 2014, 9 pages.

300

301

501

502

503

504

METHOD FOR NOISE-ROBUST COLOR CHANGES IN DIGITAL IMAGES

CROSS-REFERENCE TO RELATED APPLICATIONS

The present Application is a divisional of U.S. patent application Ser. No. 15/214,238, titled "Method for Noise-Robust Color Changes in Digital Images," filed Jul. 19, 2016, which is a divisional of U.S. patent application Ser. No. 14/485,694, titled "Method for Noise-Robust Color Changes in Digital Images," filed Sep. 13, 2014, which is a continuation of U.S. patent application Ser. No. 12/146,769, titled "Method for Noise-Robust Color Changes in Digital Images," filed Jun. 26, 2008, which claims the benefit of United States Provisional Patent Application No. 60/946,362, titled "Method for Noise-Robust Color Changes," filed Jun. 26, 2007, the contents of all of which are incorporated by reference in this disclosure in their entirety.

BACKGROUND OF THE INVENTION

Several applications for image editing allow the user to associate an enhancement or an image filter, such as a color change, with a color range. These techniques can be found in such programs as Nik Software's Color Efex Pro' and Nikon's Capture NX2™. For instance, these products contain tools allowing the user to darken all blue pixels in the image. Example tools are Channel Mixer, Select Color Range, or Hue/Saturation in Adobe® Photoshop®, Contrast Color Range in Nik Color Efex Pro™, or LCH Editor in Nikon Capture NX2™.

A common feature of these tools is that the strength of an effect is determined by the color of a pixel. The disadvantage of this approach is that small local variations among pixel values, resulting from noise and compression artifacts, can lead to larger variations in effect strength, because the small local variations are typically amplified during image editing routines.

An example filter expression is $g(x)=T[f(x)]$, where $f(x)$ is a function of x, $g(x)$ is the filtered function, and T is the filter function. The function $f(x)$ is considered a one-dimensional image because it depends on one variable. More commonly, image-editing functions filter two-dimensional images. An example two-dimensional image filter expression is $$g(x, y)=T[f(x, y)]$$

where $f(x, y)$ is a two-dimensional original image to be filtered, $g(x, y)$ is the filtered image, and T is the filter function. Here, filter inputs and outputs, such as $f$ or $g$, typically represent an image consisting of a plurality of pixels. Any specific individual pixel may be referred to by specifying the underlying coordinates, as in $f(x_0, y_0)$ is the pixel at coordinates $(x_0, y_0)$ in the image $f$.

An example filter $g=T[f]$ may perform a darkening operation. There are many ways to express a brightness change filter based on a color in a simple form, but here, a general formulation convenient for explaining the invention is used. The filtering operation may darken colors in a color range near a user-selected color, c. As a result of filtering, pixels with colors similar to the color c receive a strong darkening effect, pixels with colors dissimilar to c do not receive a darkening effect, and a smooth transition between darkened areas and areas with no darkening is desired.

A "color distance" is an inverse measure of color similarity between two pixels, with more similarly colored pixels having a smaller color distance. More precisely, a color distance, $D_c$, is a function that assigns a non-negative value to the difference in the color of two pixels. Many such distance, or difference, functions are known in the art, and have the characteristics that for any three pixels p, q, and r:

$D_c(p, q) \geq 0$ with $D_c(p, q)=0$ if and only if pixels p and q are the same color, $D_c(p, q)=D_c(q, p)$, and $D_c(p, q)+D_c(p, r) \geq D_c(p, r)$.

One suitable function measuring color distance between the color of a pixel $f(x_0, y_0)$, denoted as "color[$f(x_0, y_0)$]", and the color c is:

$$D_c=\|\text{color}[f(x_0,y_0)]-c\|_2, \quad (1)$$

where color[$f(x_0, y_0)$] and c are color values in an appropriate color reference system and $\|r\|_2$ denotes the $l^2$ norm of r, as explained further below. Appropriate color reference systems include grey-scale and color reference systems such as RGB, YCrCb, or Lab color systems, where a color c is expressed as a three-coordinate vector of values. In an RGB system, for example, c is expressed as a three-coordinate vector, c=(c[r], c[g], c[b]), where c[r] is the red coordinate, c[g] is the green coordinate, and c[b] is the blue coordinate. If $f(x_0, y_0)=(f[r], f[g], f[b])$, for example, then a suitable norm is $$D_c[f(x_0,y_0), c]=\{(c[r]-f[r])^2+(c[g]-f[g])^2+(c[b]-f[b])^2\}^{0.5}.$$

The norm above is known in the art as an $l^2$ norm. Alternatively, color distance may be expressed as an $l^1$ norm, given by $$D_c[f(x_0,y_0), c]=\|\text{color}[f(x_0,y_0)]-c\|_1 = |c[r]-f[r]|+|c[g]-f[g]|+|c[b]-f[b]|.$$

Let the function s[$f(x_0, y_0)$, c] denote a measure of similarity of color of the pixel $f(x_0, y_0)$ and the color c, such as $$s[f(x_0,y_0), c]=1/(1+D_c[f(x_0,y_0), c]). \quad (2)$$

In Equation 2, when s equals 1 there is a maximum similarity of color, and s equals zero represents a lower limit for color similarity.

A filtering effect based on similarity of color at any pixel (x, y) can be written using a filtering function $$g(x, y)=f(x, y)+\Delta h \cdot s[f(x, y), c], \quad (3)$$

with $\Delta h$ representing a maximum change in pixel color value. The value $\Delta h$ can be a scalar value if monochromatic brightness changes are desired, or it can be a color triple if a color modifying filter is desired. Note that, in typical reference color systems for digital images, darker colors have lower pixel color values, and, because the example filter produces a darkening effect, a scalar valued $\Delta h$ is less than zero for darkening.

When $\Delta h=(\Delta h[r], \Delta h[g], \Delta h[b])$ is an RGB color, the example darkening filter becomes an example color modifying filter, modifying colors in the image. Even colorizing operations can be performed in the image, such as when $\Delta h[r] > \Delta h[g] > \Delta h[b]$, for example, a filter warming up the area will be performed. Other usages of $\Delta h$ are discussed below. For purposes of the explanation that follows, the terms "warming filter," "darkening filter," and "brightness changing filter," may be used as species of "color changing filters."

Also note that, in a typical digital image, pixel color values are scaled between a value of zero and a maximum value, MAX, dependent on the number of bits representing a pixel color. Typically, when colors are represented by n-bit non-negative numbers, the maximum color value, MAX, is given by MAX=$2^n$−1. Note that a value lower than zero or higher than MAX can occur in Equation 3 and needs to be compensated for in actual code, but can be trivially corrected by saturating the formula at a lower value of zero and an upper value of MAX, as known to those skilled in the art.

An alternative change that a user may wish to perform at any pixel (x, y) is to increase or decrease the contrast in a certain area, using $$g(x, y)=f(x, y)+\Delta k\, s[f(x, y), c][f(x, y)-\bar{f}(x, y)] \qquad (4)$$

where $\Delta k$ denotes the desired contrast change, and $\bar{f}(x, y)$ denotes a lowpass filtered version of the image $f(x, y)$. In Equation 4, a value of $\Delta k$ equal to zero causes no contrast change, and a positive (negative) value of $\Delta k$ causes an increase (decrease) in contrast.

The filter used to produce $\bar{f}(x, y)$ here is not limited to a Gaussian blur. The filter may be any filter that passes low-frequency components in the image while suppressing high-frequency components, a filter known as a lowpass filter. The values from the term $[f-\bar{f}]$ on the right of Equation 4 then represents a high-pass filtering of the structure information in the image, i.e., the image with low frequency components suppressed, and therefore Equation 4 can be interpreted as a color-weighted increase of high-frequency structure information.

The color-changing and contrast-changing effects of Equation 3 and Equation 4 may be combined using the formula $$g(x, y)=f(x, y)+\{\Delta h+\Delta k[f(x, y)-\bar{f}(x, y)]\}s[f(x, y), c] \qquad (5)$$

The examples above relate to a filter that changes regions in an image that are represented by a single color. A simple version of a polarization filter, darkening and adding contrast to sky-blue areas, or a typical skin-brightening filter may be implemented using Equation 5.

However, there is an inherent disadvantage in the formulations of Equations 3 through 5, as this method is not robust in the presence of noise. Consider, for instance, an image with a large blue-sky area whose mean color value is the color c. If the image is shot with a high ISO number and with strong JPG compression, not all pixels in the sky will be equally blue. In this situation, the similarity expression s[f(x, y), c] reflects the noise present in a blue-sky pixel to a certain extent. In the worst case, where variations in the color are due only to noise but the underlying colors are very similar, the function s modifies the noise amplitude to the extent of similarity_noise_amplitude=original_noise_amplitude*max|s|.

In example Equations 3-5, the change is added to the original image. The resulting filtered image g has amplified noise, with {1+max|s|} times the amplitude of what it was in the original image. The noise increase is also based upon the values of $\Delta h$ and $\Delta k$, which is characteristic to most image editing filters. The increase in noise level will frequently be visible to the observer of the image, and visibly degrades the image.

Conventional approaches to the noise enhancement problem are (1) to first reduce the noise in the original image and then perform the filtering function, or (2) to first perform the filtering function and then reduce the noise in the resulting image. These prior art approaches have the disadvantage that actual desired features in the image are being reduced.

An alternative prior art approach is to apply noise reduction selectively to the affected areas, but this also produces unwanted side effects, such as loss of detail, unwanted artifacts, or an uneven distribution of image structure.

SUMMARY OF THE INVENTION

The invention meets this need by providing with an improved method of filtering an image reduces the noise enhancement of prior art image-enhancing filters. In prior art filtering, the magnitude of a filtering effect is based on structure in the image. The improved method processes the image while preserving the edges of the image, but reduces noise in non-edge areas. In one embodiment a structure-adaptive filter processes the image to determine the intensity of one or more image-enhancing changes, and the one or more image-enhancing changes are performed on the underlying image as a function of the determined intensity.

In an illustrative embodiment of a filter using the method, filter parameters include a selected reference color and a selected change of the reference color. The image is filtered with an edge-preserving detail-reducing filter (EPRDF). At each pixel to be modified, the selected change of color, scaled by a measure of color similarity to the selected reference color in the corresponding pixel in the EPRDF image, is added to the unmodified corresponding pixel value. In a second illustrative embodiment, the user selects filter parameters including a reference color and a change of contrast for the reference color. The image $f$ is EPDRF-filtered to produce an image $\hat{f}$, and then highpass-filtered. At each pixel to be modified, the desired change of contrast, scaled by the measure of color similarity to the selected reference color in the corresponding pixel in the EPDRF image and multiplied by the corresponding pixel in the highpass image, is added to the unmodified corresponding pixel value in the original image. In further embodiments, the methods of the first two embodiments are combined and generalized to support an arbitrary number of reference colors, and corresponding brightness and contrast changes. Alternative embodiments demonstrate a variety of uses of noise-reduced similarity functions in alternative formulations of noise-reduced image processing filters.

The color similarity function is one type of generalized structure-adaptive filter. Other embodiments of the invention utilize more complex structure-adaptive filters, and the invention includes means to modify the intensity of an enhancement effect as a function of other user selected parameters, such as pixel location, relative spatial distance, local image frequency content, or local image pattern matching.

In a preferred embodiment, a particular edge-preserving detail-reducing filter (EPRDF) is used. In addition, for some types of EPRDF, the image processing chain of the method may be differently arranged and/or differently partitioned in an equivalent structure. Example equivalent structure is described.

A method for applying an enhancement filter to a digital image with a noise level, and comprising a plurality of pixels, with minimal amplification of the noise level, is disclosed, the method comprising filtering the digital image with an edge-preserving detail-reducing filter, determining a matrix from the filtered digital image, wherein the matrix is the result of one or more structure adaptive functions applied to the filtered digital image, and wherein the matrix comprises one or more values, each of the one or more values determining a magnitude of the enhancement filter to apply at a corresponding pixel in the digital image, and modifying the digital image using the enhancement filter, adjusted by the one or more matrix values, to produce an enhanced digital image.

Alternatively, the method can proceed by first determining a matrix from the digital image, wherein the matrix is the result of one or more structure adaptive functions applied to the digital image, then filtering the matrix with an edge-preserving detail-reducing filter to generate a filtered matrix, and then performing the modifying step.

The enhancement filter can be, for example, selected from the group consisting of a color change filter, a contrast change filter, or both a color change and a contrast change filter.

The edge-preserving detail-reducing filter can be, for example, selected from the group consisting of an arctan Gaussian filter, an arctan blurring filter, a wavelet-based detail-reduction filter, a bilateral filter, a Beltrami flow filter, an adaptive Gaussian blurring filter, and an edge-preserving smoothing filter using geodesic distances.

The matrix in the determining step can further be the result of a function of one or more color similarities to a reference color, the color similarity being determined from a color distance from a corresponding pixel in the digital image to the reference color. Optionally, the matrix is the result of a function of one or more geometric distances, wherein the geometric distance is determined from the location of a corresponding pixel in the digital image in relation to a reference pixel or a reference region.

A method for enhancing a digital image with a noise level, and comprising a plurality of pixels, with minimal amplification of the noise level, is also disclosed, the method comprising filtering the digital image with an EPDR edge-preserving detail-reducing filter; generating a first image by filtering the EPDR filtered digital image with a structure-adaptive filter; generating a second image by filtering the EPDR filtered digital image with a highpass filter; and adding the first generated image and second generated image to produce an enhanced image.

The structure-adaptive filter could be, for example, a user definable image reference point or region. Further, it could comprise a function of one or more color similarities, wherein the color similarity is determined from the similarity of a corresponding pixel in the EPDR filtered digital image with a reference color. Still further, the structure-adaptive filter further comprises a function of one or more geometric distances, wherein the geometric distance is determined from the location of the corresponding pixel in relation to a reference pixel or a reference region.

A method for editing a digital image comprising a plurality of pixels, to modify similarly colored pixels and the contrast of similarly colored pixels, id disclosed, the method comprising generating lowpass and highpass versions of the digital image; receiving a set of one or more than one reference color, and for each of the one of more than one reference color, a corresponding desired color change and a corresponding desired contrast change; and modifying one or more pixels in the digital image by determining the location of each pixel to be modified in the digital image, and the location of the corresponding pixels in the lowpass version of the digital image and the highpass version of the digital image; and for each reference color in the set of one or more than one reference color, measuring the similarity of the corresponding pixels in the lowpass digital image to the reference color using a similarity function, scaling the corresponding desired color change using the measured lowpass similarities to generate a scaled color change, scaling the corresponding desired contrast change using the measured lowpass similarities to generate a scaled contrast change, determining a partial modification of the pixel values of the pixels in the digital image using the scaled color change, determining a partial modification of the pixel values of the pixels in the digital image by adding the product of the scaled contrast change and the corresponding pixel in the highpass digital image, and adding the determined partial modifications to the unmodified pixel values to produce modified pixel values.

A method of filtering a digital image comprising pixels with an edge-preserving detail-reducing filter, is disclosed, the method comprising filtering the digital image with a lowpass filter; applying a constraining function to limit the differences between the digital image and the lowpass filtered image; and adding the constrained differences to the digital image to produce a edge-preserved detail-reduced digital image. The constraining function could be, for example, an arctan function.

An apparatus for image editing is described, the apparatus comprising a memory, a processor, an input/output interface, and a set of processor instructions, stored in the memory, wherein, when the set of processor instructions are accessed by the processor and executed, the set of executed processor instructions are operable to receive one or more user-selectable image editing parameters; access a digital image in memory to be modified, wherein the digital image comprises a plurality of pixels; filter the digital image with an edge-preserving detail-reducing filter; determine a matrix from the filtered digital image, wherein the matrix is the result of one or more structure adaptive functions applied to the filtered digital image, and wherein the matrix comprises one or more values, each of the one or more values determining a magnitude of an enhancement effect to apply at a pixel in the digital image; and modifying the digital image using an enhancement filter, adjusted by the one or more matrix values, to produce an enhanced image.

BRIEF DESCRIPTION OF THE DRAWINGS

These and other features, aspects, and advantages of the present invention will become better understood with reference to the following description, illustrations, equations, appended claims, and accompanying drawings where:

Figure 7:
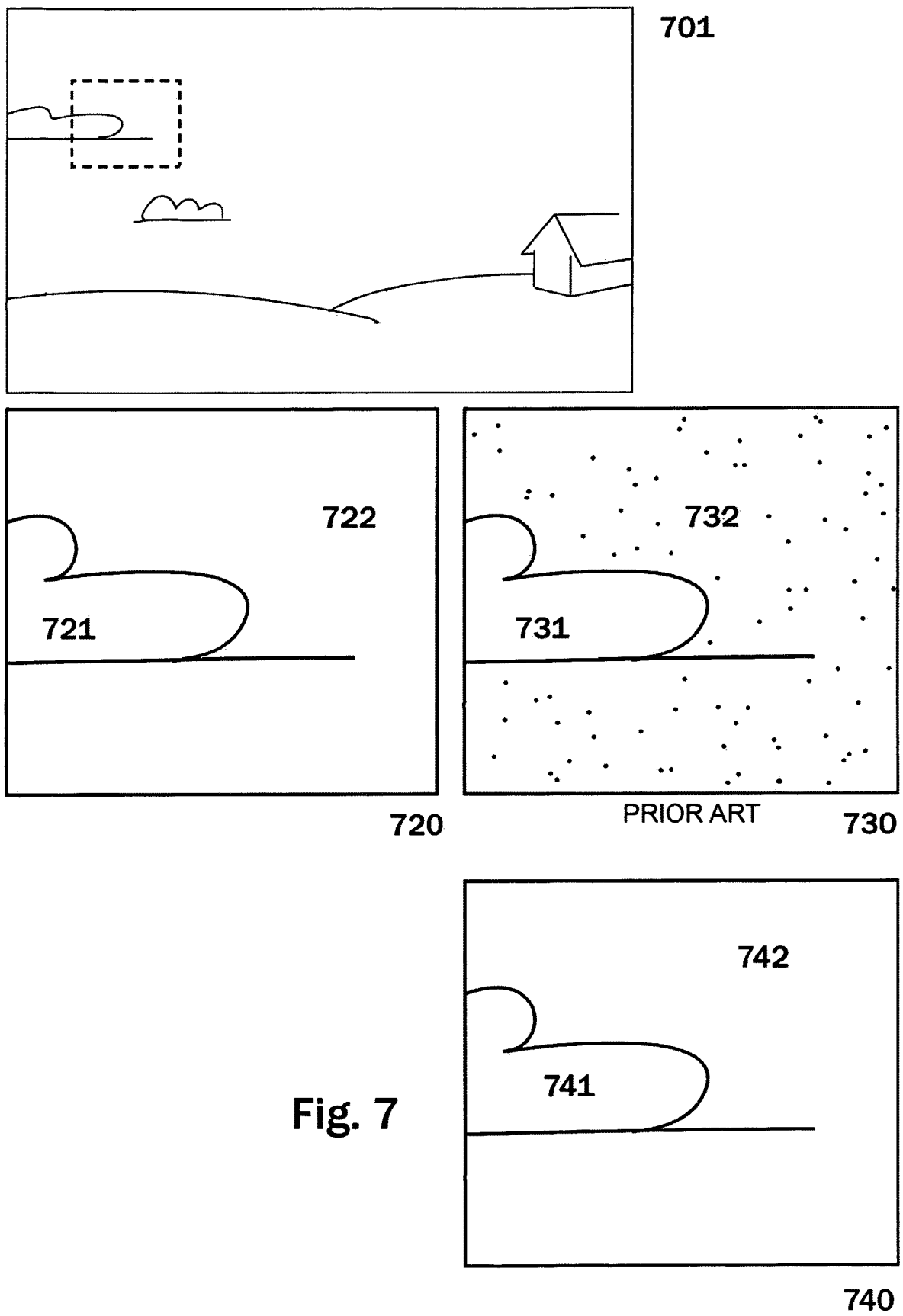

FIG. 7 shows an unfiltered two-dimensional image 701, a detailed close-up view 720 of the section of the original image in 701 enclosed by a dashed rectangle, the same close-up view 730 after application of a polarization filter using the prior art, and the same close-up view 740 after application of a polarization filter using one embodiment of the present invention.

Figure 8:
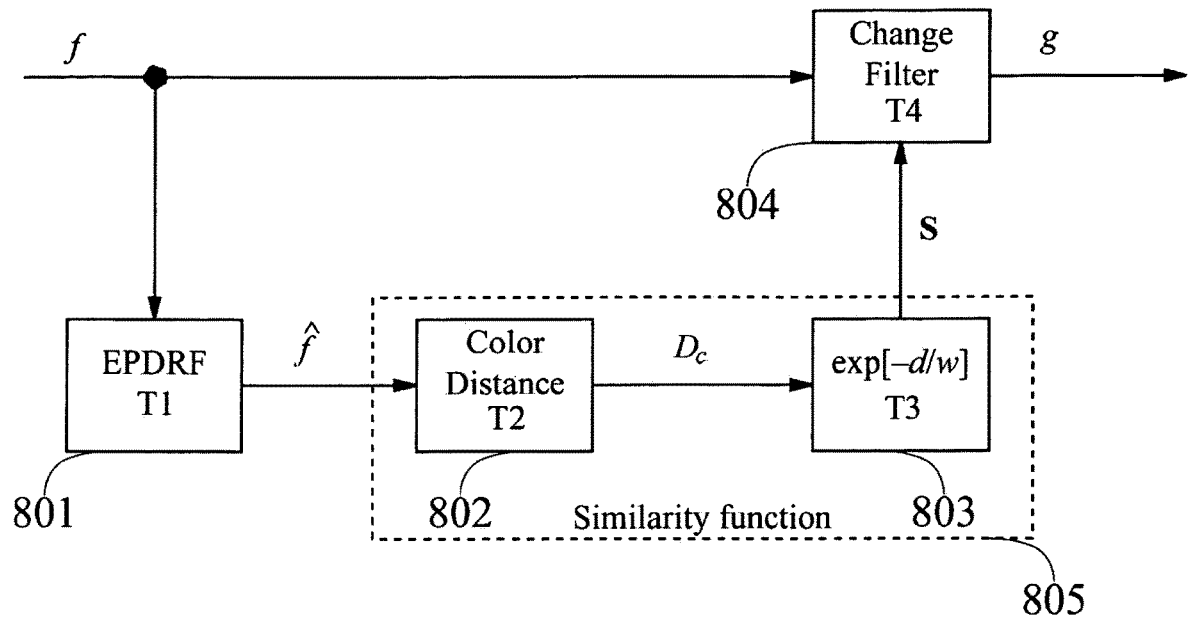

FIG. 8 shows an example embodiment as a functionally partitioned block diagram.

Figure 9:
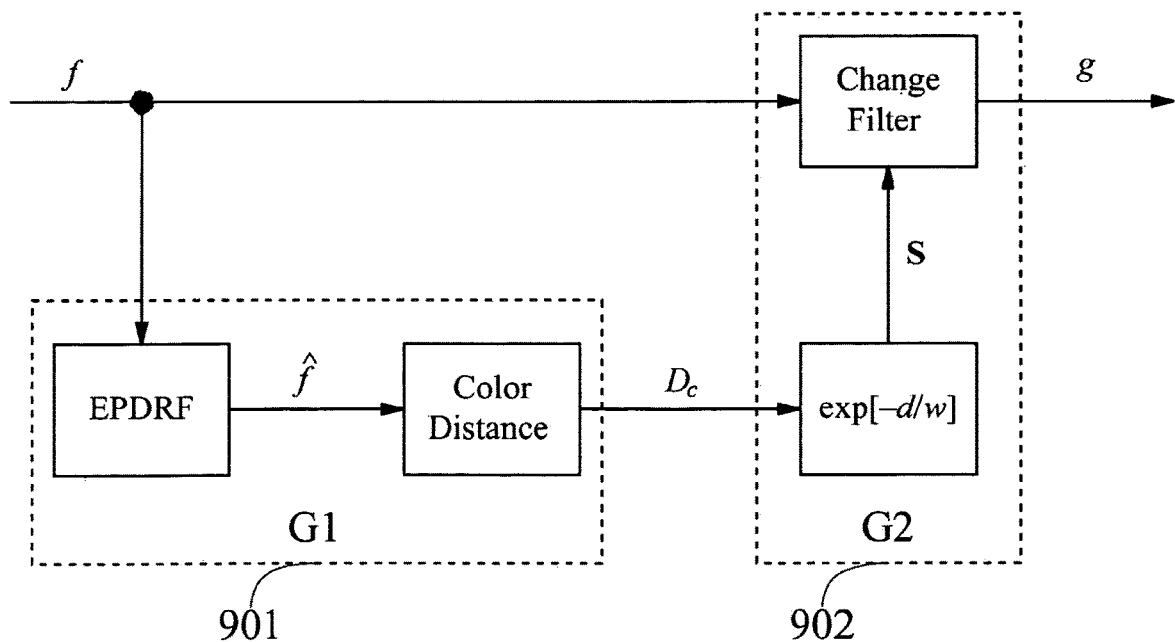

FIG. 9 shows a structure equivalent to FIG. 8 with different partitioning.

DETAILED DESCRIPTION OF THE INVENTION

The invention is useable as a plug-in supplemental program similar to Nik Color Efex Pro™, as an independent module that may be integrated into any commercially available image processing program such as Adobe® Photoshop®, Apple® Aperture®, or Nikon Capture NX2™, into any image processing device that is capable of modifying and displaying an image, such as a color copier or a self service photo print kiosk, or even a camera, as a dynamic library file or similar module that may be implemented into other software programs whereby image measurement and modification may be useful, or as a stand alone software program. These are all examples, without limitation, of image processing of a digital image. Although embodiments of the invention adjusting color, contrast, noise reduction, and sharpening are described, the present invention is useful for altering any attribute or feature of the digital image.

Furthermore, it will become clear with regard to the current invention that the user interface for the current invention may have various embodiments, which will become clear later in this disclosure.

A. Color Change Filter

As noted above, there are many ways to express an image-processing filter. A simple color-based brightness change filter is used to illustrate the method of the current invention. The method is usable with a wide variety of other structure-adaptive filters, as described further below. As noted above, a suitable similarity function at any point (x, y) is given by:

$$s[f(x, y), c]=1/(1+D_c[f(x, y), c]).$$

Alternate suitable embodiments of a similarity function include $$s[f(x, y), c]=1/(1+w^2 D_c[f(x, y), c]),$$

$$s[f(x, y), c]=1/(1+|w|D_c[f(x, y), c]),$$

$$s[f(x, y), c]=\text{exponential}(-D_c[f(x, y), c]/w^2), \text{ and}$$

$$s[f(x, y), c]=\text{exponential}(-D_c[f(x, y), c]/|w|),$$

where w is a spreading parameter affecting the breadth of similar colors.

Equation 3 may be rewritten for any point (x, y) as:

$$g(x, y)=f(x, y)+\Delta h\, s[f(x, y), c],$$

$$g(x, y)=f(x, y)+\text{ChangeIntensity}[\Delta h, c, f(x, y)],$$
where (6)

$$\text{ChangeIntensity}[\Delta h, c, f(x, y)]=\Delta h\, s[f(x, y), c]. \quad (7)$$

In Equation (7), the desired color change, $\Delta h$, is scaled by a measure of similarity in the image $f$ to the reference color c at the coordinates (x, y) to determine the amount of change in the pixels of $f$ at the corresponding coordinates. (A pixel in one image corresponds to a pixel in another image if they have the same coordinates.)

An improved form of example Equation 7 provides a significant advantage in the treatment of noise. Instead, an improved filter uses the function $$\text{ChangeIntensity}[\Delta h, c, \hat{f}(x, y)]=\Delta h\, s[\hat{f}(x, y), c],$$
where (8)

$\hat{f}(x, y)=E[f(x, y)]$ is a filtered version of $f(x, y)$.

In the improved filter, the desired color change, $\Delta h$, is scaled by a measure of similarity in the image $\hat{f}$ to the reference color c at the coordinates (x, y) to determine the amount of change at the corresponding coordinates. The filter E is an edge-preserving detail-reducing filter (EPDRF), as discussed in more detail below.

A generalization of Equation 6 is provided by:

$$g(x, y)=\text{ColorChange}\{f(x, y), \text{ChangeIntensity}[\Delta h, c, \hat{f}(x, y)]\},$$

$$g(x, y)=\text{ColorChange}\{f(x, y), u\}, \quad (9)$$

where ColorChange$\{f(x, y), u\}$ represents a function applying a desired color change intensity u to the color values of the unmodified pixels of $f(x, y)$. Example ColorChange functions are $$\text{Colorchange}\{f(x, y), u\}=f(x, y)+u, \quad (10)$$

$$\text{Colorchange}\{f(x, y), u\}=f(x, y)\, u, \text{ or} \quad (11)$$

$$\text{Colorchange}\{f(x, y), u\}=f(x, y)\, \text{exponential}[u], \quad (12)$$

The quantity u, output from the ChangeIntensity function, may be thought of as a scalar quantity, or alternatively, the change in color applied in Equations 10 to 12 may be expressed, for example, as a three-component RGB color u=(u[r], u[g], u[b]).

Note that, in Equation 7, $f$ is a direct input of the function ChangeIntensity. Therefore, the ChangeIntensity function is susceptible to noise in $f$. In the improved Equation 8, the ChangeIntensity function reduces noise by modifying the image $f$ to create an image $\hat{f}$ to measure similarity, while applying the filtering result to the actual image, as in Equation 9 and example Equations 10 to 12. In other words, in this embodiment the color change filter is a function of both the original image, and a change in intensity that is itself a function of a version of the original image filtered with an EPDRF filter. The increase in noise level, if any, should be minimal, and may not be visible to the average observer of a printed or displayed version of the enhanced image.

B. The EPRDF

In Equations 8 and 9, a filtered image $\hat{f}$ is being used for the detection of the desired change, while the color changes are rendered based on the unmodified values of $f$. If $\hat{f}$ is a noise-reduced version of $f$, the resulting filtered image g will contain all the desired color changes, but the increase in noise is less than that using the original image $f$ as input to the similarity function as in Equation 7. If, in addition, $\hat{f}$ preserves the edges of $f$, the resulting filtered image g will contain all the original detail of $f$.

TABLE 1

EPDRF filtering techniques and relative complexity

| Name of Technique | Typical Processing Requirements |
|---|---|
| Wavelet-based noise reduction | high |
| Bilateral Filters | low |
| Arctan Gaussian | low |
| Heat diffusion processes | medium |
| Beltrami flow filter | medium |
| Adaptive Gaussian blurring | low |

Various example EPDRF filtering techniques and their relative processing requirements are shown in Table 1. Those skilled in the art will know that implementing these advanced noise-reduction techniques can be very computationally intensive. For instance, the technique known as wavelet-based noise reduction requires a lot of processing time and memory if the results are to be visually appealing. However, the requirements for a filter to produce the image $\hat{f}$ for the current convention can be substantially less strict than those for the advanced EPDRF techniques of Table 1 and still produce visually appealing results.

Any edge-preserving detail-reducing filter (EPDRF) filter can be used for the creation of $\hat{f}$ from $f$. An EPDRF, as defined hereinafter, is a filter that reduces the weak high-frequency detail in the image while leaving the strong edges in the image unaffected. EPDRF filtering techniques are known by various names in the art, such as "edge-preserving smoothing filters," "edge-based adaptive smoothing," "edge-preserving MAP estimation," "nonlinear mean filters, " "detail-preserving smoothing," "edge preserving filters using geodesic distances," "feature-preserving de-noising," "edge-sensitive smoothing," "nonlinear smoothing," "adaptive Gaussian blurring" and "bilateral filters." The EPDRF filtering problem and a bilateral filtering solution are discussed in C. Tomasi & R. Manducci, *Bilateral Filtering for Gray and Color Images*, in Proceedings of the IEEE Conference on Computer Vision, pp. 839-846, January 1998.

Figure 3:
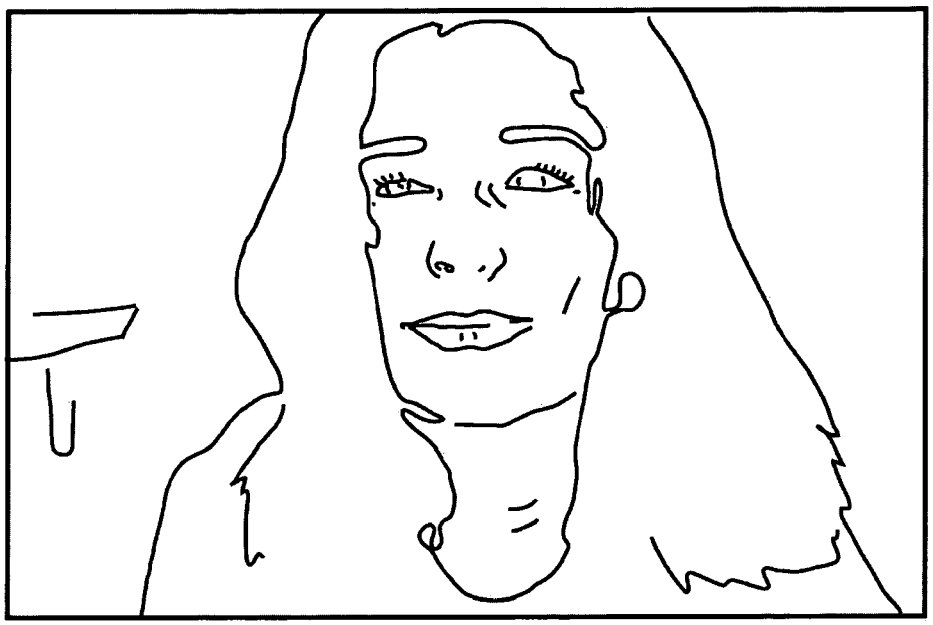
FIG. 3 shows the result of applying an EPRDF to a sketched portrait image 300, resulting in a filtered image 301 useable according to the invention as an input to a color change filter.
Figure 3:
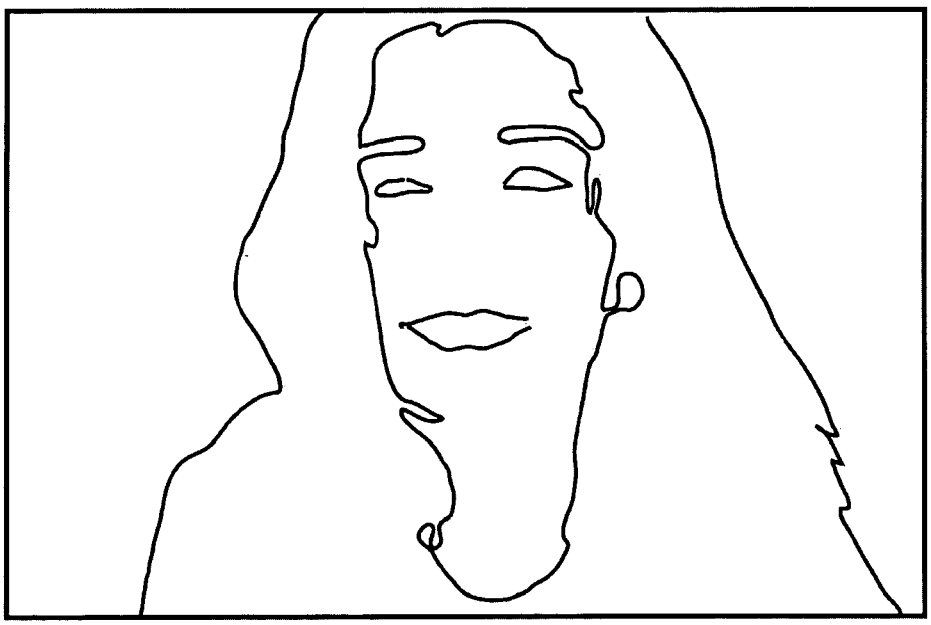

FIG. 3 illustrates the effect of applying an EPDRF. In FIG. 3, image 300 depicts an image before filtering with an EPRDF, while image 301 is the result of applying an EPDRF to image 300.

As discussed above, the resulting image g is computed based on the original image $f$, containing the original noise and artifacts, while the change intensity value is computed based on $\hat{f}$, containing less noise and artifacts. Hence, the resulting image g still contains all of the original noise, artifacts and detail, but the contrast and color changing routine does not increase this detail, resulting in a natural looking image with visual appeal.

C. Embodiments of the EPRDF Function

The Arctan Gaussian filter is an example EPRDF suitable to practice the invention. The Arctan Gaussian is further generalized here to provide an Arctan Blurring filter. The Arctan Blurring filter provides a very fast yet effective implementation of an EPDRF filter for the invention.

Let $f$ be the unfiltered image and let $\bar{f}(x, y)=T[f(x, y)]$ be a blurred version of the image. The function T, for example, could provide a Gaussian blur, but $\bar{f}$ can be the blurred result of any lowpass filtering of $f$. An EPDRF version $\hat{f}$ of $f$ can be described in one embodiment as $$\hat{f}(x, y)=f(x, y)+[\bar{f}(x, y)-f(x, y)] \arctan(\|\bar{f}(x, y)-f(x, y)\|), \quad (13)$$

where "|| ||" denotes a color norm. In an alternate embodiment for a color system which can be linearly scaled, each component of the color of $[\bar{f}(x, y)-f(x, y)]$ is scaled by an arctan function. In an RGB color system, for example $$\hat{f}_r(x, y)=f_r(x, y)+\arctan(\bar{f}_r(x, y)-f_r(x, y)),$$

$$\hat{f}_g(x, y)=f_g(x, y)+\arctan(\bar{f}_g(x, y)-f_g(x, y)),$$

$$\hat{f}_b(x, y)=f_b(x, y)+\arctan(\bar{f}_b(x, y)-f_b(x, y)),$$

Alternatively, instead of the arctan function, any other continuous, monotonic function H, with a rate of change denoted H', that satisfies the following four conditions may be used:

$$H'(0)=1, \quad (i)$$

$$H(0)=0, \quad (ii)$$

$$H'(x)=0 \text{ for } |x|>>0, \text{ and} \quad (iii)$$

$$|H(x)|<\varepsilon \text{ for all } x, \quad (iv) \quad (14)$$

where $\varepsilon$ is a small quantity. For example, with H(x) defined by if(x<$\varepsilon$), then H(x)=x; else H(x)=$\varepsilon$, the generalized resulting EPDRF version $\hat{f}$ of $f$ can be described in one embodiment as $$\hat{f}=f+(\bar{f}-f) H[\|\bar{f}-f\|]/\{\|\bar{f}-f\|\}. \quad (15)$$

Equation 15 and the conditions on the function H in Equation 14 can be interpreted as follows. In featureless areas, the difference between $\bar{f}$ and $f$ is small and therefore, in a feature-less area, the image $\hat{f}$ is close to the blurred version $\bar{f}$. In edgy areas, the difference between $\bar{f}$ and $f$ is large and therefore the image $\hat{f}$ approximately equals the image $f$ with the magnitude of difference limited by $\varepsilon$. In other words, the resulting image is expressed as a sum of the image and the difference between the blurred image and the image, with the difference limited when the magnitude is too large.

This means that in plain areas the image $\hat{f}$ is close to the blurred version of $f$, in edgy, high frequency areas the image $\hat{f}$ equals the image $f$ with an addition or subtraction not exceeding $\varepsilon$. In even other words, the image is expressed as a sum of the image and the difference between the blurred image and the original image, while said difference is damped in its amplitude if it is high.

Figure 5:
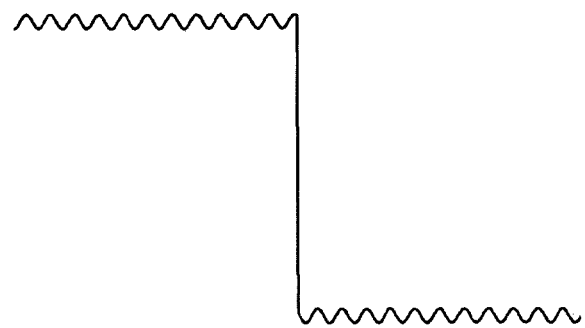
FIG. 5 illustrates a one dimensional image 501, a blurred version of that image 502, an embodiment of an EPDRF 504, and the resulting image 503 showing suppression of noise in feature-less areas, filtered according to one embodiment of the invention.
Figure 5:
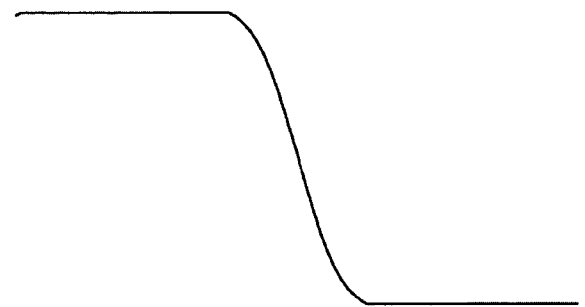
Figure 5:
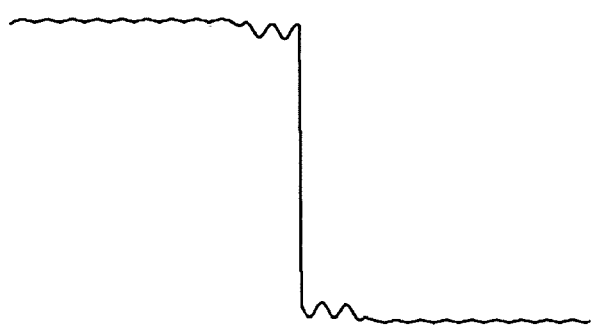
Figure 5:
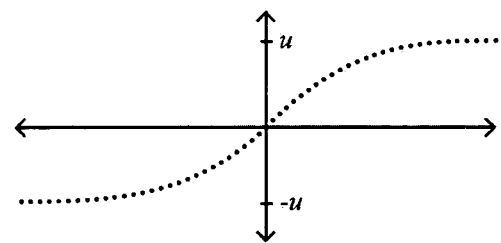

FIG. 5 illustrates the concept with a one-dimensional image. Waveform 501 indicates an unfiltered one-dimensional image $f(x)$, including a strong edge and relatively plain areas with overlaid sinusoidal noise. Waveform 502 illustrates a blurred image of waveform 501. Graph 504 illustrates an example function satisfying the conditions of Equation 14. Waveform 503 displays the one-dimensional image $\hat{f}(x)$ determined using an Arctan Gaussian as the function H. In a single-dimensional Gaussian blur, the coefficients of a filter are approximately proportional to $$H(x) \sim \exp[-x^2/2r^2],$$

whereas, for a two-dimensional Gaussian blur, $$H(x, y) \sim \exp[-(x^2+y^2)/2r^2],$$

where r is referred to as the radius of the distribution. Note that, in waveform 503, the one-dimensional image $\hat{f}(x)$ shown suppression of noise in featureless areas, while preserving structure near edges.

D. Contrast Change Filter

Similarly, an embodiment of a contrast-changing filter using the method of the current invention uses a variant of Equation 4, repeated here:

$$g(x, y)=f(x, y)+\Delta k \, s[f(x, y), c][f(x, y)-\bar{f}(x, y)],$$
where where $\Delta k$ denotes the desired contrast change, and $\bar{f}(x, y)$ denotes a lowpass filtered version of the image $f(x, y)$ for any point $(x, y)$. In Equation 4, a value of $\Delta k$ equal to zero causes no contrast change, and a positive (negative) value of $\Delta k$ causes an increase (decrease) in contrast. This may be modified to become $$g(x, y) = \text{ContrastChange}\{f(x, y), \text{ChangeIntensity}[\Delta k, c, \hat{f}(x, y)]\}, \text{ where} \quad (16)$$

$$\text{ChangeIntensity}[\Delta k, c, \hat{f}(x, y)] = \Delta k \, s[\hat{f}(x, y), c], \text{ and} \quad (17)$$

$$\text{ContrastChange}\{f(x, y), v\} = f(x, y) + v[f(x, y) - \bar{f}(x, y)]. \quad (18)$$

In this example embodiment, Equation 17, like Equation 8, uses a similarity function operating on the EPDRF filtered image $\hat{f}(x, y)$ to scale the desired effect.

E. Combining a Color and Contrast Change

Equations 9 and 16 may be combined and generalized to combine a desired color and contrast change. In this case, a general form for the filter is given by $$g(x, y) = \text{CombinedChange}\{f(x, y), \text{DualChangeIntensity}[\hat{f}(x, y), \Delta h, \Delta k, c]\}, \text{ where} \quad (19)$$

$$\text{DualChangeIntensity}[\hat{f}(x, y), \Delta h, \Delta k, c] = (u_{xy}, v_{xy}) \quad (20)$$

$$\text{CombinedChange}\{u, v\}_{xy} = f(x, y) + u_{xy} + v_{xy}[f(x, y) - \bar{f}(x, y)], \quad (21)$$

where, as in Equations 8 and 17, $$u_{xy} = \text{ChangeIntensity}[\Delta h, c, \hat{f}(x, y)], \text{ and}$$

$$v_{xy} = \text{ChangeIntensity}[\Delta k, c, \hat{f}(x, y)].$$

F. Combining Multiple Color and Contrast Changes

Equation 19 may also be generalized for an arbitrary number of reference colors. This can be described by introducing a series of N three-component controls $$CCT = \{(c[1], \Delta h[1], \Delta k[1]), \ldots, (c[N], \Delta h[N], \Delta k[N])\}, \quad (22)$$

hereinafter named the Color Change Table (CCT), where, when index n ranges from 1 to N, each $c[n]$ represents a reference color, each $\Delta h[n]$ represents a corresponding desired color change, and each $\Delta k[n]$ represents a corresponding desired contrast change. Equation 19 may be re-expressed as:

$$\text{CombinedChange}(u, v)_{xy} = f(x, y) + \text{Modification}(u, v)_{xy}, \text{ where}$$

$$\text{Modification}(u, v)_{xy} = u_{xy} + v_{xy}[f(x, y) - \bar{f}(x, y)]. \quad (23)$$

For an arbitrary number of reference colors, the modifications are combined in the image editing function by defining $$\text{CombinedMods}_{xy} = \Sigma \, \text{Modification}(u[n], v[n])_{xy}, \quad (24)$$

where the summation ranges from n equals one to N. The $n^{th}$ pair of scaled changes is given by $$(u[n], v[n])_{xy} = \text{DualChangeIntensity}\{\hat{f}(x, y), \Delta h[n], \Delta k[n], c[n]\}, \quad (25)$$

as in Equation 20 where $c[n]$ is the $n^{th}$ reference color, $\Delta h[n]$ is the corresponding $n^{th}$ desired color change, and $\Delta k[n]$ is the corresponding $n^{th}$ desired contrast change. The output of the filter is given by $$g(x, y) = f(x, y) + \text{CombinedMods}_{xy}. \quad (26)$$

G. Alternate Formulation of the Filtering Functions

In the filters described above, the method applies an EPDRF to determine the channel used to calculate the effect intensity. It does not apply the EPDRF to the original image component of the resultant image, and does not apply the EPRDF to the resultant image. Several alternate embodiments similar to example Equation 8 can be used to achieve the desired effect. Two embodiments are:

$$M = \text{Colorchange}\{f(x, y), \text{EPRDF}[\text{ChangeIntensity}(f(x, y), c)]\}, \text{ and} \quad (27)$$

$$M = \text{Colorchange}\{\hat{f}(x, y), \text{ChangeIntensity}(\hat{f}(x, y), c)\} + (f(x, y) - \hat{f}(x, y)). \quad (28)$$

where $\hat{f}(x, y) = \text{EPRDF}(f(x, y))$.

In Equation 8, the effect intensity is calculated based upon an EPDRF version off and then applied to $f$. In Equation 27, an EPDRF function is applied to a matrix representing a plurality of effect intensities, the result of which is then applied to $f$. In Equation 28, the details are being removed from $f$ with an EPDRF, to which the effect is then being applied, and then the detail, $(f - \hat{f})$, is added to the image again.

H. Generalization of the Filtering Functions

In a further generalization, consider any filter of the form $$g(x, y) = T\{f(x, y), a_{xy}(f)\}, \text{ where} \quad (29)$$

$f(x, y)$ is a two-dimensional original image to be filtered;
$a_{xy}(f)$ is a scalar-valued function that defines the intensity of an image change at the coordinates $(x, y)$ as a function of the image $f$;
$T$ is an image filter, modifying an image based on provided scalar intensity; and
$g(x, y)$ is the two-dimensional filtered image.

The reader may note that this is a generalization of Equations 6 to 7, where $$a_{xy} = \Delta h \, s(f(x, y), c).$$

In this example, the scalar-valued intensity function is a function of two arguments, the similarity of a pixels to a reference color, and a user-selected color change, $\Delta h$. As used hereinafter, the function that generates the scalar-valued intensity function is defined as a structure-adaptive filter if each output of the filter comprises a function of the color of an associated pixel. Functions of the color of the pixels may include quantities derived from the color, such as brightness, luminosity, saturation, hue, and color temperature. A structure-adaptive filter can also functionally depend on one or more additional parameters, including the location of the associated pixel, the neighboring pixels' values, pattern matching in a neighborhood of the associated pixel, frequency content in a neighborhood of the associated pixel, directional orientation of present structure, entropy of the pixels and neighboring pixels, or one or more other user-selected parameters.

Let $\hat{f}$ be an EPDRF filtered version of $f$. Using this notation, embodiments of filters of the present invention may be expressed as:

$$g = T\{f, a(\hat{f})\}, \quad (30)$$

$$g = T[f, \text{EPRDF}\{a(f)\}], \text{ and} \quad (31)$$

$$g = T\{\hat{f}, a(\hat{f})\} + (f - \hat{f}). \quad (32)$$

In Equation 30, the EPDRF filter is applied to the image $f$ to create $\hat{f}$, while the structure-adaptive filter is applied to the image $\hat{f}$. In Equation 31, the structure-adaptive filter is applied to the original image, but an EPDRF is applied to the result. In Equation 32, the entire image filtering function, consisting of the filter function T as well as the scalar-valued function a, is applied on an EPDRF version of $f$, but to avoid loss of detail, the image details in $(f-\hat{f})$ are restored by adding the last term. Note that, for some editing functions T, the formulas turn out to be equivalent. For instance, when T is a ColorChange function given by Equation 10, Equations 30-32 are equivalent. Also note that, in the alternate embodiment of Equation 31, the edge-data used by the EPDRF can be derived from the original image $f$ instead of ChangeIntensity($f$, c), providing results with better precision in some implementations. Other embodiments of the structure-adaptive filter are discussed below.

I. Illustrative Results

Figure 1:
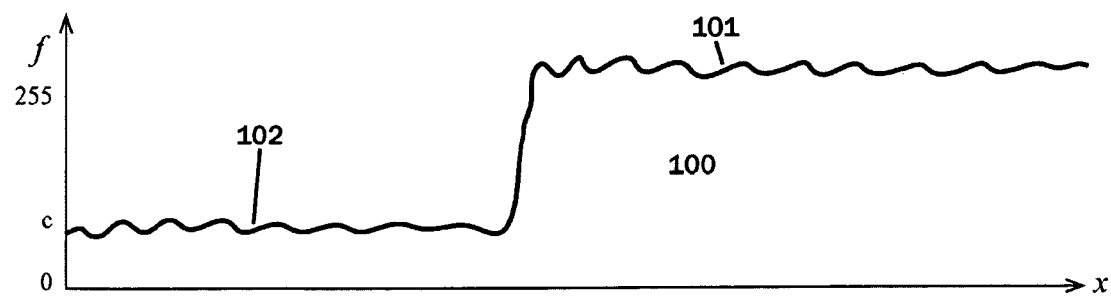
FIG. 1 shows a prior art brightening filter 103 applied to a waveform 100 with a noisy bright area 101 and a noisy dark area 102, which results in a waveform 104 with amplified noise.
Figure 1:
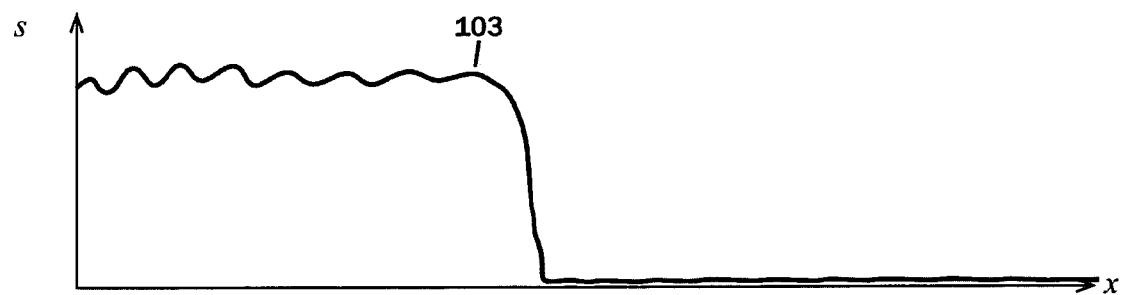
Figure 1:
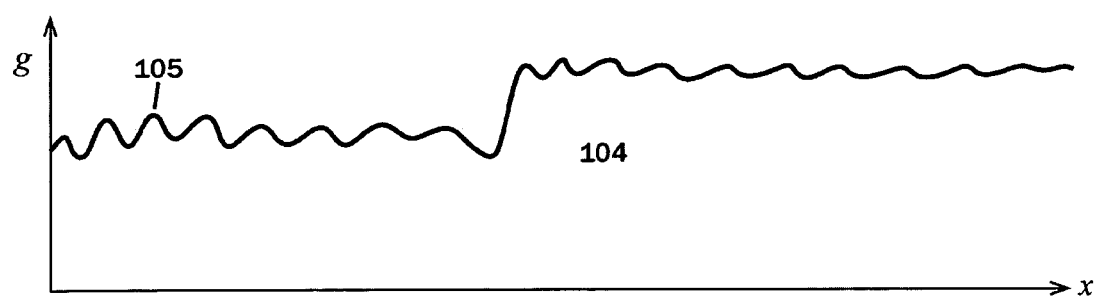
Figure 2:
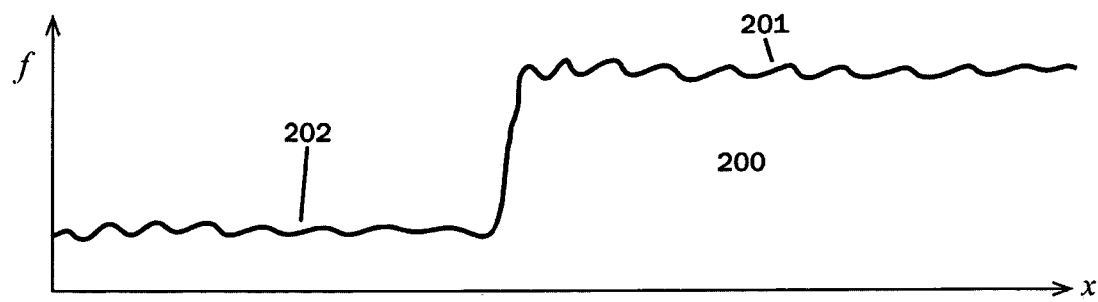
FIG. 2 shows the result of applying a filter according to one embodiment of the invention to the waveform of FIG. 1, resulting in noise in waveform 207 approximately to the same extent as in the original waveform 200.
Figure 2:
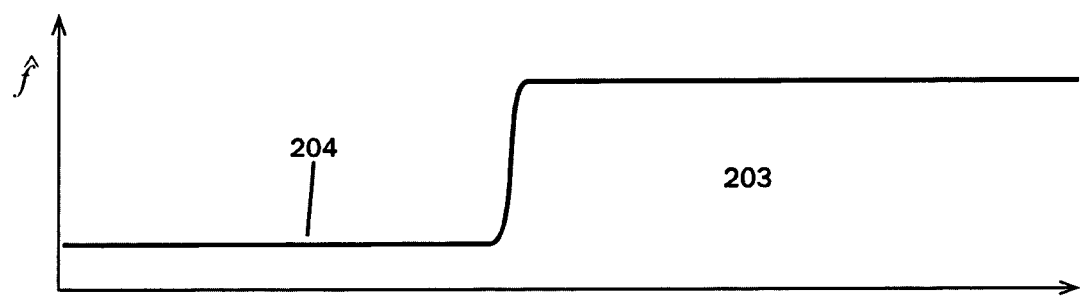
Figure 2:
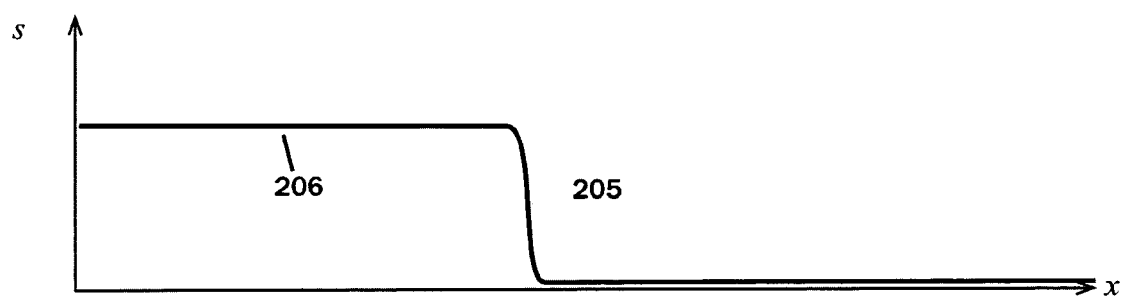
Figure 2:
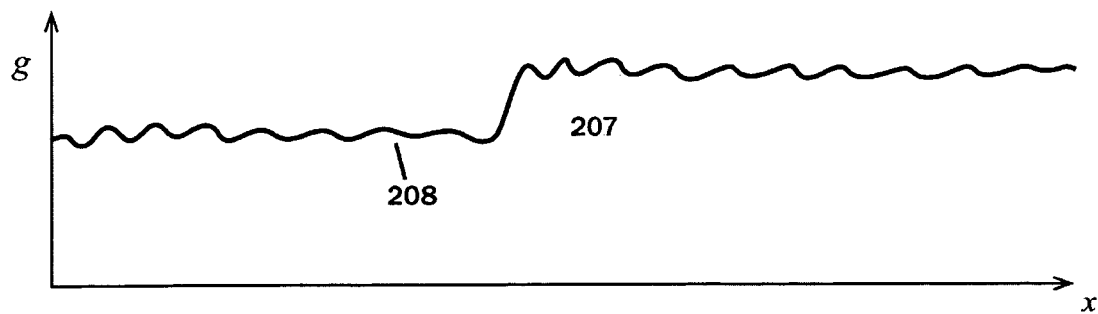

FIG. 1 represents a prior art one-dimensional filtering enhancement, while FIG. 2 represents the same enhancement using the disclosed method. FIG. 1 is calculated using Equation 7, whereas FIG. 2 is determined using Equation 8.

In FIG. 1, the waveform 100 shows two areas, a noisy bright area 101 and a noisy dark area 102. Note that on the vertical axis the average luminosity of area 102 is labeled with c. The signal 103 below shows the result of filtering 100 with s($f$, c). As shown in 103, the similarity measure shows high values for the area corresponding to 102, but due to the noise, the left side of signal 103 is not even at its maximum value. On the right side of signal 103, the similarity in color values is small. The signal 104 shows the result of applying a brightening filter operating on colors close to color c using the similarity function. The noise present in 102 is amplified on the left side in 103, and appears amplified 105 in the resulting enhanced image 104.

In FIG. 2, the signal 200, with right side portion 201 and left side portion 202, is a duplicate of 100. The signal $\hat{f}$ shown in 203 is the result of applying an EPDRF to $f$. It can be observed that the noisy dark area 202 has turned into a noise-free dark area 204. The result of the same similarity function applied to $\hat{f}$ is shown as 205. The similarity calculation shows a plain, noise-less plateau 206 with a sharp edge. The signal 207 shows the result of applying the modified brightening filter to 200. The noise is neither amplified nor reduced, but is still present in the left side of the resulting image 208 approximately to the same extent as in the original region 202.

J. Example Filter Functions

J1. Polarization

A simple digital approach to creating a polarization-like effect, mainly intended to darken the sky, is to darken all blue areas in the image. Note that commercial polarization filters need to do more refined operations to affect contrast, colors, and color brilliance. For clarity of explanation purposes, this example will focus on merely darkening the blue colors. A polarization filter can be implemented using Equation 8 with $g=\text{Colorchange}\{f,\text{ChangeIntensity}[\hat{f}, c, \Delta h]\}$, where c equals the blue color value,
$\Delta h$ is negative, and
$\hat{f}$ is the result of applying an EPDRF to $f$.

In FIG. 7, an unfiltered two-dimensional image 701 is shown. A detailed close-up view 720 shows the section of the original image in 701 enclosed by a dashed rectangle. A polarization filter is simulated to create the output images. Image 730 shows the resulting close-up view in the prior art method, as in Equation 7. Image 740 shows the resulting close-up view produced by the described method in Equation 8. Note that, in both 730 and 740, blue pixels became darker, but 730 contains amplified noise as compared to the prior art filtered image in 740.

J2. Brightening Skin

An example filter intended to brighten up skin colors can be implemented using Equation 8 with $M=\text{Colorchange}\{f,\text{ChangeIntensity}[\hat{f}, c, \Delta h]\}$, where c equals a skin tone color value,
$\Delta h$ is positive, and
$\hat{f}$ is the result of applying an EPDRF to $f$.

J3. Conversion of Color Image to Black and White

This example filter would simulate a real-world red-orange color filter used to capture an image in an analog black and white camera. The example simulation filter operates on sampled color values using Equations 22-26 with $g=BW\{f(x, y)+\text{CombinedMods}_{xy}\}$, where $N=5$, $c[1]$=a red color value, $c[2]$=an orange color value, $c[3]$=a yellow color value, $c[4]$=a green color value, $c[5]$=a blue color value, $\Delta h[1]=\Delta h[2]=1$, $\Delta h[3]=0.5$, $\Delta h[4]=\Delta h[5]=-1$, $\Delta k[n]=0$ for all $n$, and the function BW calculates a grey scale value as a function of a color value.

K. Structure-Adaptive Filtering Including Location and Color Dependent Enhancements.

The invention may be used to improve noise immunity in all image-editing functions where the color of a pixel influences the strength of an applied effect. Improved noise immunity is achieved in simple filters, like the one improved in Equations 7-8, where effect intensity depends only on color similarity, and more complex filters where effect intensity depends not only on similarity to a reference color, but also on one or more factors based on the spatial location or other structural information within the image. For instance, a more complex filter darkens blue pixels in the upper half of the image and brightens green pixels in the lower half of the image.

The inventor has provide other examples of structure-adaptive filters in various United States patent applications, the content of each of which is incorporated by reference in this disclosure in its entirety, as follows: U.S. Pat. No. 7,257,269, titled "Digital Polarization Filter," filed Jun. 27, 2003; U.S. patent application Ser. No. 11/674,080, titled "Self-Adaptive Brush for Digital Images," filed Feb. 12, 2007, now Publication No. 2007/0188510; U.S. Pat. No. 6,865,300, titled "User Defineable Image Reference Points," filed Apr. 13, 2004; U.S. Pat. No. 6,728,421, titled "User Defineable Image Reference Points," filed Apr. 13, 2004; U.S. Pat. No. 7,031,547, titled "User Defineable Image Reference Points," filed Mar. 3, 2005; and U.S. patent application Ser. No. 11/832,599, titled "User Definable Image Reference Regions," filed Aug. 1, 2007, now Publication No. 2008/0137952.

These example filters include not only functionality to receive user input to identify one or more reference colors and a means of measuring a color difference from the one or more reference colors, but also functionality to receive user input related to spatial intensity of the filter. For instance, user input related to spatial intensity can specify an area of an image defined by a single pixel or reference point, bounding coordinates, an arbitrarily defined region, or a brush stroke. Image-processing software then uses this spatial intensity input in combination with a pixel's color dependency to determine the strength of a desired effect for each pixel.

All of the example image-editing systems above have in common that the intensity of an effect applied at a pixels is dependent, among other user-input parameters, on the color attributes of a pixel. The examples above include systems where a structure-adaptive system is implemented that receives input from a user in the form of regions of interest, of locations of interest, or of brush strokes that are subject to be refined by software.

In one embodiment, a function $s(f, x, y<, \ldots, \ldots>)$ for processing a two-dimensional image $f$ is considered structure-adaptive when $$|\partial s/\partial x|<\varepsilon,$$

$$|\partial s/\partial y|<\varepsilon, \text{ and}$$

$$|\partial s/\partial f|<\varepsilon,$$

for a small quantity E; and there exist images $f_1$, $f_2$ and location coordinates (x, y) such that $$s(f_1, x, y<, \ldots, \ldots>) \neq s(f_2, x, y<, \ldots, \ldots>).$$

The expression $<, \ldots, \ldots>$ indicates that s can have one or more optional parameters, such as user-provided region boundaries, coordinates, brush stroke data, global filtering strengths, pattern matching parameters, and the like.

A structure-adaptive function $s(f, x, y, <, \ldots, \ldots>)$ that computes a scalar value or weight for every pixel in $f$ may be used to produce a structure-adaptive enhancement filter. An enhancement filter that processes an image is considered structure-adaptive when the filter comprises a structure-adaptive function s used to determine to what extent a pixel or an attribute of a pixel in the image is changed. The attributes may include any stored attribute of a pixel or a quantity determined as a function of stored attributes of a pixel, such as brightness, sharpness, saturation, warmth, hue, opacity, and the like.

The matrix of values provided by s calculated for a certain image $f$, collectively associated with an image, would normally have some edges and, typically, all the edges found in an image corresponding to s would coincide with the edges found in $f$. In some degenerate cases, however, an image $f$ can be found where a corresponding image may not have edges. For instance, s can be a function that detects a color similarity to a reference blue color, but an image $f$ may not contain any blue colors. In some cases, depending on its implementation, an image corresponding to s may not show any edges or corners. In addition, the orientation of the edges in an image corresponding to s do not have to be identical to the orientation of the edges in $f$, where orientation is understood as the sign of the color difference from one side of the edge to the other side, and not the spatial, directional orientation.

In another embodiment, a filter is considered structure-adaptive to an image $f$ if the image contains details (twigs, eyelashes, grain, noise, JPG-artifacts, skin pores etc.) and if the strength of the effect applied by the filter varies in the vicinity of some of said details as a function of said details.

In the example image-editing systems above, one value of effect intensity is calculated for every pixel by a function s. The examples can benefit from the invention using, for example, the three embodiments of Equations 30-32:
 i. the entire method is applied to a EPDRF version of the image, and then the remaining high-frequency component is added onto the result, as in Equation 32; or
 ii. the said effect intensity is calculated based on an EPDRF version of the image and then the effect is applied to the original image, as in Equation 30; or
 iii. the said effect intensity value is calculated for every pixels and considered a filtered image, and then an EPDRF version of said filtered image can be used for enhancing the original image, as in Equation 31.

In further embodiments, two or more instances of this invention may be implemented, so that in one software application two or more effect intensity values can be processed per pixel, for instance to empower the user to selectively modify brightness and color temperature within one software module, or red, green, blue component, or sharpness, contrast and hue.

Figure 4:
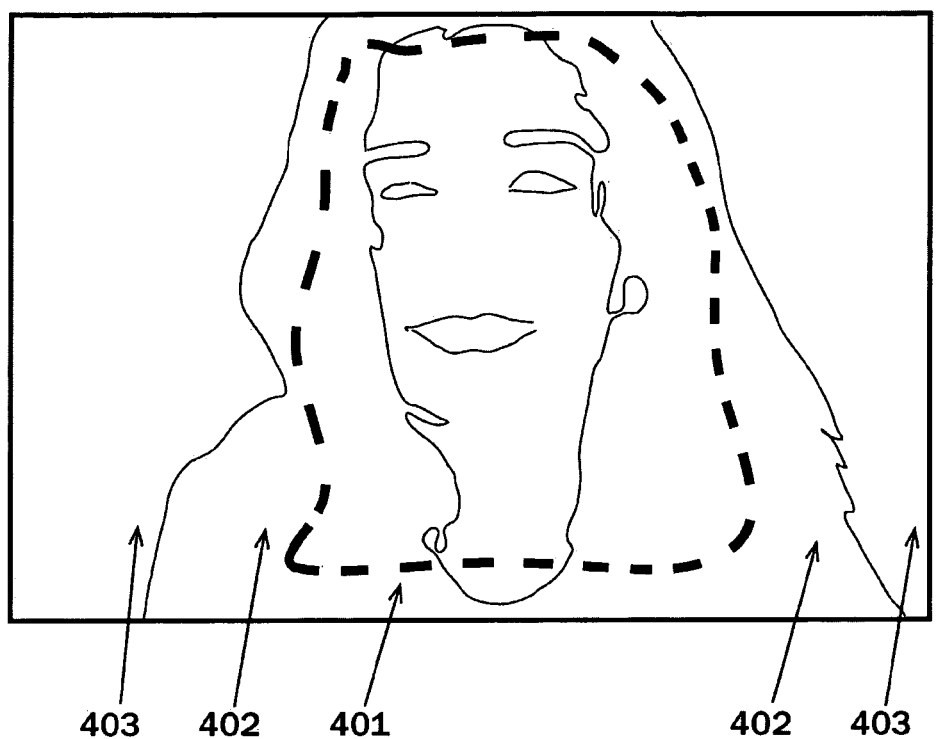
FIG. 4 is a sketch of an image where the dotted line 401 encloses a region of interest, showing areas with varying spatial and color distances to the region of interest, which will be affected by the structure adaptive aspect of the present invention to a greater or lesser extent.

FIG. 4 illustrates the use of the described method, shown with respect to the example of image reference regions. The dotted line 401 encloses a region that the user is interested in editing. Area 402 shows pixels that have a low spatial distance to the boundary of the user-set location 401 and that have a low color distance to the color of the user-set location. Area 403 shows pixels that have a higher spatial distance to the boundary of the user-set location 401 and that have a higher color distance to the color of the user-set location. The far-away pixels of area 403 will be affected to a lesser extent by the image enhancement associated with the region of interest, while the nearby pixels in 402 will be affected to a higher extent by said image enhancement. This example would be structure-adaptive and hence could benefit from this invention by using an EPDRF version of the image for determining the color space distances. Noise in the image areas 402 and 403 will not degrade the result of the enhancement.

Figure 6:
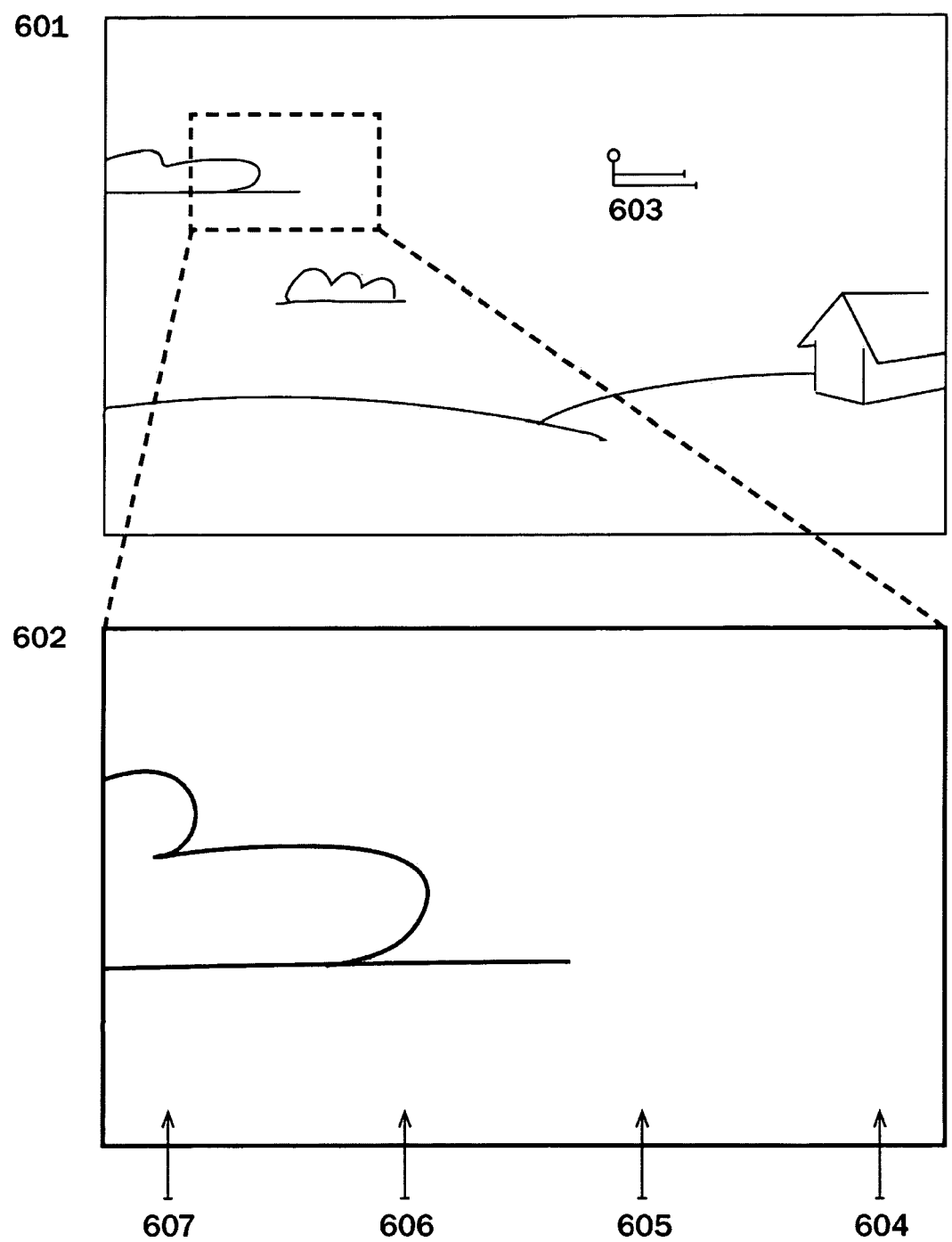
FIG. 6 illustrates a sketch of an image 601 being edited using control icon 603, and a close-up view of a portion 602 of that image, in which the change applied at 603 is targeted to impact a color region as well as to impact a spatial region, resulting in spatial variation in application of the change.

FIG. 6 shows an image 601 with a region that the user is interested in editing in the same context of the above referenced patents titled User Defineable Image Reference Points. The area enclosed by a dashed rectangle in 601 is shown at a larger scale and in greater detail in 602. Area 602 depicts a close-up view including part of a cloud in the sky. A selective, color-based enhancement has been positioned in the right area of image 601, as indicated by control icon 603. For more information on the meaning and use of image editing control icons, see the patents referenced above relating to User Defineable Image Reference Points. Assume that the color at locations 604, 605, 606, and 607 is approximately the same. Since the color/contrast change applied at 603 is targeted to impact a color region as well as to impact a spatial region, pixels near to 603 are more affected than far-away pixels of the same color. The location 604 within 602 will be more affected by color changes than the location 605, the location 605 will be more affected by color changes than the location 606, and location 606 will be more affected than location 607. If the control icon 603 controls an operation to darken blue pixels, for example, nearby blue pixels at 604 will be more affected by this operation than blue pixels at 605, which are more affected than blue pixels at 606, which are in turn more affected than blue pixels at 607. The inventions titled User Defineable Image Reference Points, can also benefit from the improved noise immunity of the invention disclosed herein.

In one embodiment, operations that combine a color range and a spatial range can be approximated locally, at least in very small areas of the image, as a purely color-based contrast change. The invention described herein can also be modified to apply in these cases. In order to localize effects, each effect is associated with a location. The CCT is modified to produce a color-location change table (CLCT), where each entry is a four-component control consisting of a color, a location-dependent function, a corresponding desired color change, and a corresponding desired contrast change. A CLCT with N entries is given by CLCT={(c[1], L[1], Δh[1], Δk[1]), . . . , (c[N], L[N], Δh[N], Δk[N])}.

The modified filtering equation is $$g = \text{LocalChanges}\{f, \text{LocationIntensities}(\hat{f}, \text{CLCT})\},$$
where (33)

$\hat{f}$ is an EPDRF version of $f$.

The new location-dependent functions L[1], . . . , L[N] are determined from locations in the image. For example, the functions {L[1], . . . , L[N]} can be a measure of spatial distance to a reference pixel or to a reference group of pixels. In other words, L[n] is a function that scales the desired color and contrast change performed at various pixel locations. The $n^{th}$ location-dependent function, L[n], has a particular value at the coordinates (x, y), denoted L[n]$_{xy}$. L[n]$_{xy}$ indicates how much the $n^{th}$ image-enhancing function affects the image pixel at the location with coordinates (x, y).

In one embodiment of a location-dependent structure-adaptive filter, the intensity of an effect at a pixel is dependent on the Euclidean distance of the pixel from a reference object as well as the color distance from a reference color. In one example embodiment, the user centers the $n^{th}$ color and contrast change at pixel coordinates (x[n], y[n]), and the structure-adaptive filter function at a pixel with coordinates (x, y) is $$a_{xy} = \exp[-\{(x-x[n])^2 + (y-y[n])^2\}/2r^2] \cdot s(\hat{f}(x, y), c[n]).$$

The matrix L[n] for the reference color c[n] may contain the values of $$\exp[-\{(x-x[n])^2 + (y-y[n])^2\}/2r^2],$$

for example. The radius r may be assigned a default value, or, alternatively, r is a user-selectable parameter.

Since {L[1], . . . , L[N]} typically represent continuous underlying functions, they change only gradually from pixel to pixel, and therefore abrupt changes in the filtered image are only generated by a contrast change when the difference in similarity to a reference color between adjacent pixels is large, that is, when 1 s($f$[p], c[n])−s($f$[q], c[n]) 1 is large with p and q adjacent pixels in the image. Using the described method to measure the difference in similarity based on $\hat{f}$, large differences in adjacent pixels will be ameliorated, with improved visual quality in the resulting filtered image.

L. Alternate Embodiments of Image Processing Path

FIG. 8 is a block diagram of an image-processing filter using one embodiment of the invention. The overall filter may be, for example, a ColorChange filter as described. The user selects a reference color c, a maximum amount of color change Δh, and an optional spreading parameter w, for use with an exponential similarity function.

In the specific embodiment of FIG. 8, the input image $f$ is filtered with an EPDRF filter to generate an image $\hat{f}$ in filter 801, denoted T1. The similarity of pixels in the image $\hat{f}$ to the reference color c is measured in Similarity Function block 805. The similarity measurement, along with the original image $f$, is input to the image change filter 804, denoted T4. The image change filter, for example, may implement Equation 8, repeated here, $$g(x, y) = f(x, y) + \Delta h \ s(\hat{f}(x, y), c).$$

Note that FIG. 8 contains a plurality of cascaded filtering operations. A person of ordinary skill in the art will appreciate that the output of cascaded filters may be generated by a number of equivalent filtering configurations. For example, when two linear time-invariant filters, T1 and T2, are cascaded, the two filters may be combined in a single filter G1, where the transfer function of the filter G1 in the spatial domain is the convolution of the filter T1 and the filter T2 in the spatial domain, or equivalently, where the transfer function of the filter G1 in the frequency domain is the product of the filter T1 and the filter T2 in the frequency domain. Alternatively, the cascading order of filters T1 and T2 may be reversed, but the reversed cascade of T2 followed by T1 produces the same filtered output, D$_c$. Similarly, the cascade of filter T3 and T4 in FIG. 8 may be replaced a single equivalent filter, G2 902. An example equivalent to the image-processing diagram of FIG. 8 is shown in FIG. 9.

As a concrete example, the filter 801 may use a 23 by 23 mask to filter the original image $f$, where the filtering operation is represented by $$\hat{f}(x, y) = 1/b \Sigma\Sigma k_{ij} f[(x-12+i), (y-12+j)], \text{ where}$$

$$b = \Sigma\Sigma k_{ij},$$

and where the double summations run from i equals 1 to 23 and j equals 1 to 23. The ColorDistance filter T2 802 determines the distance from an output pixel of T1 to the reference color c, and may, for example, be $$D_c(x, y) = \|\hat{f}(x, y) - c\|_2.$$

The cascade of filters T1 and T2 is represented by a single filter G1 901 in FIG. 9, where the spatial-domain transfer function of filter G1 is given by $$D_c(x, y) = 1/b \|\Sigma\Sigma k_{ij} \{f[(x-12+i), (y-12+j)] - c\}\|_2. \quad (34)$$

Note that, in FIG. 9, neither the EPDRF filtered image $\hat{f}$, nor the output of the similarity function s, are explicitly determined. Instead, values of the filtered image $\hat{f}$ are implicitly combined using a norm to create a color distance mask D$_c$. Alternatively, the color distance mask D$_c$ of Equation 34 may be thought of as the norm of pixels in the image ($f$−c) filtered by an EPDRF filter. The color distance mask D$_c$ is further combined with the original image $f$ in the filter G2 902 to generate the modified image g, implicitly based on determining a similarity function. Although the configuration of FIG. 9 does not explicitly calculate a similarity function as a separate step or quantity, a person of ordinary skill in the art will recognize that FIG. 9 is the image-processing equivalent of FIG. 8, and may be substituted as an embodiment of the invention without departing from the true scope of the invention.

M. Additional Comments

Note also that various user-editing operations can be combined in a similar manner. The result of the function ChangeIntensity can be interpreted as a selection-strength instead of a color change, used to determine how much a particular editing operation contributes to the filtering result. The resulting combined user-editing operations will be less subject to noise in the filtered image.

Advantageously, the invention can be embodied on a computer readable medium having contents for causing a computer-based information handling system to perform the steps described herein.

The invention is not limited to a particular computer hardware implementation, and any hardware implementation presently existing or to be developed that permits processing of digital images using the described method can be used.

The term memory block or data block refers to any possible computer-related image storage structure known to those skilled in the art, including but not limited to RAM, processor cache, hard drive, or combinations of those, including dynamic memory structures. The described methods can be embodied in a computer program that operates as a stand-alone computer application, or can be provided as a plug-in application augmenting the capabilities of an existing image-processing program. Further, the methods described herein can be embodied in supplemental tools for an existing program, in independent modules that can be integrated into any commercially available image-processing program, or integrated into any image-processing device that is capable of modifying and displaying an image, such as a color copier or a self service photo print kiosk. The methods can be implemented in dynamic library files or similar modules that can be combined with other software programs facilitating image modification. The methods can also be used in an image-processing program accessed over a network.

Any currently existing or future developed computer readable medium suitable for storing data can be used to store the programs embodying the afore-described interface, methods and algorithms, including, but not limited to hard drives, floppy disks, digital tape, flash cards, compact discs, and DVDs. The computer readable medium can comprise more than one device, such as two linked hard drives.

The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

As used in this disclosure, except where the context requires otherwise, the term "comprise" and variations of the term, such as "comprising", "comprises" and "comprised" are not intended to exclude other additives, components, integers or steps.

The term "storage medium" can represent one or more devices for storing data, including read-only memory (ROM), random access memory (RAM), magnetic disk storage mediums, optical storage mediums, flash memory devices, electrical storage mediums or other mediums for storing information in a form readable by a machine such as, for example, a computer. The term "data element" refers to any quantum of data packaged as a single item. The term "data unit" refers to a collection of data elements or data units that comprise a logical section. The term "image block" refers to a complete copy or partial copy of a digital image that is stored in a separate storage location and can be altered without affecting the original stored digital image.

In the foregoing specification, the invention has been described with reference to specific embodiments thereof. It will, however, be evident that various modifications and changes can be made thereto without departing from the broader spirit and scope of the invention. The specification and drawing are, accordingly, to be regarded in an illustrative rather than a restrictive sense. It should be appreciated that the present invention should not be construed as limited by such embodiments.

What is claimed is:

1. A method to edit a digital image, the method comprising:
    generating a lowpass version of the digital image;
    receiving a set of one or more reference colors, and for each of the one or more reference colors, a corresponding requested color change; and
    modifying one or more pixels of the digital image by:
        determining a location of each pixel to be modified in the digital image, and a location of a corresponding pixel in the lowpass version of the digital image;
        for each reference color in the set of one or more reference colors,
            measuring similarity of the corresponding pixel in the lowpass version of the digital image to the reference color, wherein the similarity includes a color similarity; and
            scaling the corresponding requested color change using the measured similarity to generate a scaled color change; and
        applying the scaled color change to unmodified pixel values of the one or more pixels in the digital image to produce modified pixel values of a modified image.

2. The method of claim 1 wherein applying the scaled color change includes adding the scaled color change to the unmodified pixel values to produce the modified pixel values.

3. The method of claim 1 wherein applying the scaled color change includes multiplying the scaled color change by the unmodified pixel values to produce the modified pixel values.

4. The method of claim 1 wherein generating the lowpass version of the digital image includes using an edge-preserving detail-reducing (EPDR) filter to filter the digital image.

5. The method of claim 4 wherein the EPDR filter is selected from the group consisting of an arctan blurring filter, a wavelet-based detail-reduction filter, a bilateral filter, a Beltrami flow filter, an adaptive Gaussian blurring filter, and an edge-preserving smoothing filter using geodesic distances.

6. The method of claim 1 wherein measuring the similarity of the corresponding pixel in the lowpass version of the digital image to the reference color is performed using a similarity function.

7. The method of claim 1 wherein the color similarity includes similarity of brightness.

8. The method of claim 1 wherein the color similarity includes similarity of hue.

9. The method of claim 1 wherein the color similarity includes similarity of at least one of: luminosity, saturation, or color temperature.

10. The method of claim 1 further comprising:
    generating a highpass version of the digital image;
    receiving a corresponding requested contrast change for each of the one or more reference colors;
    determining a location of the corresponding pixel in the highpass version of the digital image, wherein modifying one or more pixels in the digital image further includes:
for each reference color in the set of one or more reference colors,
scaling the corresponding requested contrast change using the measured similarity to generate a scaled contrast change;
determining a first partial modification of the pixel values of the pixels in the digital image using the scaled color change; and
determining a second partial modification of the pixel values of the pixels in the digital image based on the scaled contrast change and the corresponding pixels in the highpass version of the digital image; and
adding the first partial modification and the second partial modification to the unmodified pixel values of the one or more pixels in the digital image to produce modified pixel values.

11. The method of claim 10 wherein determining the second partial modification includes adding a product of the scaled contrast change and the corresponding pixel in the highpass version of the digital image.

12. The method of claim 1 wherein scaling the corresponding requested color change is performed using a structure adaptive filter that determines an intensity of the scaled color change based on the color similarity between a color of the corresponding pixel and the reference color.

13. The method of claim 12 wherein the structure adaptive filter determines the intensity of the scaled color change additionally based on a respective geometric distance of each respective pixel to a reference location in the lowpass version of the digital image, wherein the reference location is one of a reference pixel and a reference region.

14. A system comprising:
one or more memory devices;
one or more processors; and
logic encoded in the one or more memory devices for execution by the one or more processors and when executed operable to perform operations comprising:
generating a lowpass version of a digital image;
receiving a set of one or more reference colors, and for each of the one or more reference colors, a corresponding requested color change; and
modifying pixels of the digital image by:
determining locations of the pixels to be modified in the digital image, and locations of corresponding pixels in the lowpass version of the digital image;
for each reference color in the set of one or more reference colors,
measuring similarities of the corresponding pixels in the lowpass version of the digital image to the reference color, wherein the similarity includes a color similarity; and
scaling the corresponding requested color change using the measured similarity to generate a scaled color change; and
applying the scaled color change to unmodified pixel values of the one or more pixels in the digital image to produce modified pixel values of a modified image.

15. The system of claim 14 wherein the operation of generating the lowpass version of the digital image includes using an edge-preserving detail-reducing (EPDR) filter to filter the digital image.

16. The system of claim 14 further comprising:
generating a highpass version of the digital image;
receiving a corresponding requested contrast change for each of the one of more reference colors;
determining a location of the corresponding pixels in the highpass version of the digital image,
wherein modifying the pixels in the digital image further includes:
for each reference color in the set of one or more reference colors,
scaling the corresponding requested contrast change using the measured similarity to generate a scaled contrast change;
determining a first partial modification of the pixel values of the pixels in the digital image using the scaled color change; and
determining a second partial modification of the pixel values of the pixels in the digital image based on the scaled contrast change and the corresponding pixels in the highpass version of the digital image; and
adding the first partial modification and the second partial modification to the unmodified pixel values to produce modified pixel values.

17. The system of claim 14 wherein the operation of scaling the corresponding requested color change is performed using a structure adaptive filter that determines an intensity of the scaled color change based on the color similarity between a color of the corresponding pixels and the reference color.

18. The system of claim 17 wherein the structure adaptive filter determines an intensity of the scaled color change additionally based on a respective geometric distance of each respective pixel to a reference location in the lowpass version of the digital image, wherein the reference location is one of a reference pixel and a reference region.

19. A non-transitory computer readable medium having stored thereon program instructions that, when executed by a processor, cause the processor to perform operations including:
generating a lowpass version of a digital image;
generating a highpass version of the digital image;
receiving a set of one or more reference colors;
receiving, for each of the one or more reference colors, a corresponding requested color change and a corresponding requested contrast change; and
modifying one or more pixels in the digital image by:
determining a location of each pixel to be modified in the digital image, and a location of a corresponding pixel in the lowpass version of the digital image and the highpass version of the digital image; and
for each reference color in the set of one or more reference colors,
measuring similarity of the corresponding pixels in the lowpass version of the digital image to the reference color using a similarity function,
scaling the corresponding requested color change using the measured similarity to generate a scaled color change,
scaling the corresponding requested contrast change using the measured similarity to generate a scaled contrast change,
determining a first partial modification of the pixel values of the pixels in the digital image using the scaled color change,
determining a second partial modification of the pixel values of the pixels in the digital image based on the scaled contrast change and the corresponding pixels in the highpass version of the digital image, and adding the first partial modification and the second partial modification to unmodified pixel values of the one or more pixels in the digital image to produce modified pixel values.

20. The non-transitory computer readable medium of claim 19 wherein the operation of determining the second partial modification includes adding the product of the scaled contrast change and the corresponding pixels in the highpass version of the digital image.

* * * * *

UNITED STATES PATENT AND TRADEMARK OFFICE
CERTIFICATE OF CORRECTION

PATENT NO. : 10,554,857 B2  
APPLICATION NO. : 15/842813  
DATED : February 4, 2020  
INVENTOR(S) : Kokemohr It is certified that error appears in the above-identified patent and that said Letters Patent is hereby corrected as shown below:

In the Claims

In Column 22, Line 7, please delete "pixels in the" and insert -- pixels of the -- therefor.

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*